United States Patent
Bartley et al.

(10) Patent No.: US 9,887,840 B2
(45) Date of Patent: Feb. 6, 2018

(54) SCRAMBLING BIT TRANSMISSIONS

(71) Applicant: International Business Machines Corporation, Armonk, NY (US)

(72) Inventors: Gerald K. Bartley, Rochester, MN (US); Darryl J. Becker, Rochester, MN (US); Matthew S. Doyle, Chatfield, MN (US); Mark O. Maxson, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 14/869,375

(22) Filed: Sep. 29, 2015

(65) Prior Publication Data

US 2017/0093568 A1    Mar. 30, 2017

(51) Int. Cl.
  *H04L 9/08*   (2006.01)
  *G06F 13/42*  (2006.01)
  *G06F 1/12*   (2006.01)

(52) U.S. Cl.
  CPC .............. *H04L 9/0869* (2013.01); *G06F 1/12* (2013.01); *G06F 13/4221* (2013.01); *H04L 2209/34* (2013.01)

(58) Field of Classification Search
  CPC ....... H04L 9/0869; G06F 1/12; G06F 13/4221
  See application file for complete search history.

(56) References Cited

U.S. PATENT DOCUMENTS

| | | | |
|---|---|---|---|
| 4,845,664 A | | 7/1989 | Aichelmann, Jr. et al. |
| 7,206,797 B2 * | | 4/2007 | Gressel ................... G06F 7/582 |
| | | | 708/250 |
| 7,263,540 B1 | | 8/2007 | Kuehnel |
| 7,283,527 B2 | | 10/2007 | Brown et al. |
| 7,356,708 B2 | | 4/2008 | Dellow |
| 8,379,847 B2 | | 2/2013 | Bell, Jr. et al. |
| 8,891,759 B2 | | 11/2014 | Itoh et al. |
| 2006/0239453 A1 | | 10/2006 | Halpern |
| 2009/0080665 A1 | | 3/2009 | Patel |
| 2009/0252326 A1 | | 10/2009 | Buchmann et al. |
| 2012/0218992 A1 | | 8/2012 | Effenberger |
| 2014/0269954 A1 | | 9/2014 | Whitby-Strevens |

OTHER PUBLICATIONS

IBM, et al., "Method for Setting C2 Security Bit", IP.com Prior Art Database Technical Disclosure. Original Publication Date: Feb. 1, 1993. Original Disclosure Information: TDB v36 n2 02-93 p. 421-422. IP.Com No. IPCOM000103954D. IP.com Electronic Publication: Mar. 18, 2005.

* cited by examiner

*Primary Examiner* — Tri Tran
(74) *Attorney, Agent, or Firm* — Robert J. Shatto (57) ABSTRACT

A bus communicates bits in parallel between a transmitter and receiver. A selected set of bits has its bits scrambled. Scrambling the bits includes assigning two or more bits of the selected set of bits to atypical lanes of the bus. By scrambling the bits, the order in which the bits of the selected set of bits are ready by a processer are obscured. The set of bits is transmitted to the receiver with one or more delays. The delays are on one or more of the lanes of the bus. The delays indicate the order of the bits. The receiver is configured to use the delays to identify the order of the bits and unscramble the set of bits.

20 Claims, 4 Drawing Sheets

SCRAMBLING BIT TRANSMISSIONS

BACKGROUND

Modern computing buses can have multiple lanes between the transmitter and a receiver. The transmitter and receiver may have different internal clocks. By using signal-matching techniques such as delay lines, shift registers, or phase-rotators, a transmission sent over a series of lanes from a transmitter may be configured to sync up and/or with the clock of a receiver. The lanes of a bus may be used to send one or more bytes in a single transmission by sending numerous bits of a byte in parallel.

SUMMARY

Embodiments of the disclosure provide a method, system, and computer program product for scrambling bit transmissions. A bus may communicate bits in parallel between a transmitter and receiver. A selected byte may have its bits scrambled. Scrambling the bits may include assigning two or more bits of the selected byte to atypical lanes of the bus. By scrambling the bits, the order in which the bits of the selected byte are read by a processer is obscured. The byte may be transmitted to the receiver with one or more negative or positive delays. The delays may be on one or more of the lanes of the bus. The delays may indicate the order of the bits. The receiver may be configured to use the delays to identify the order of the bits and unscramble the byte.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to various embodiments of a system and method for scrambling and unscrambling the transmission of a byte between a transmitter and receiver. A byte transmission may be scrambled such that the order of bits within the byte may be obscured. In order for the receiver to unscramble the bit transmission, the transmitter may communicate the order of the bits within the byte. The order of the bits may be communicated with one or more delay adjustments for the transmission of some of the bits. The receiver and transmitter may have internal clocks which are aligned using signal-matched techniques. The receiver may detect the negative or positive delays by comparing against the aligned signals. While the present disclosure is not necessarily limited to such applications, various aspects of the disclosure may be appreciated through a discussion of various examples using this context. Examples and example values discussed herein are provided by way of example only and are not to be construed as limiting.

In instances, the clock of a receiver may be aligned with the clock of a transmitter using signal-matching techniques. A bus may include multiple signal lines, each with a slightly different length/impedance/delay, etc. All eight bits of a byte may be sent in parallel from a transmitter to a receiver in a single transmission. Transmissions along these lines may therefore arrive at times which are aligned relative to the receiver sampling clock. As such, if an unauthorized party gains access to the bus transmitting this byte, the contents of the byte may be easily identified and potentially misappropriated.

Aspects of the disclosure are directed towards scrambling a bit transmission. The bit transmission may be scrambled such that the bits are not transmitted in the typical order/location. For example, the first bit (e.g., bit zero) may normally be sent in a first lane of a bus, but when scrambled is sent in a second lane. By scrambling the bits of the transmission, an unauthorized party which has circumvented physical security and probed a multi-wire bus may only gain access to what appears to be a garbled transmission. The receiver may further identify the intended order of bits using negative or positive delays within the lanes. The delays may be determined after the initial delay calibration algorithm is executed. The delays may be generated by the transmitter. The nature of using these delays to identify the intended order may change over time. By changing the manner of communicating the order of transmitted bits, an unauthorized user who manages to decipher a bit transmission at one point in time may be unable to decipher a bit transmission at a second period of time when the manner has changed.

Figure 1:
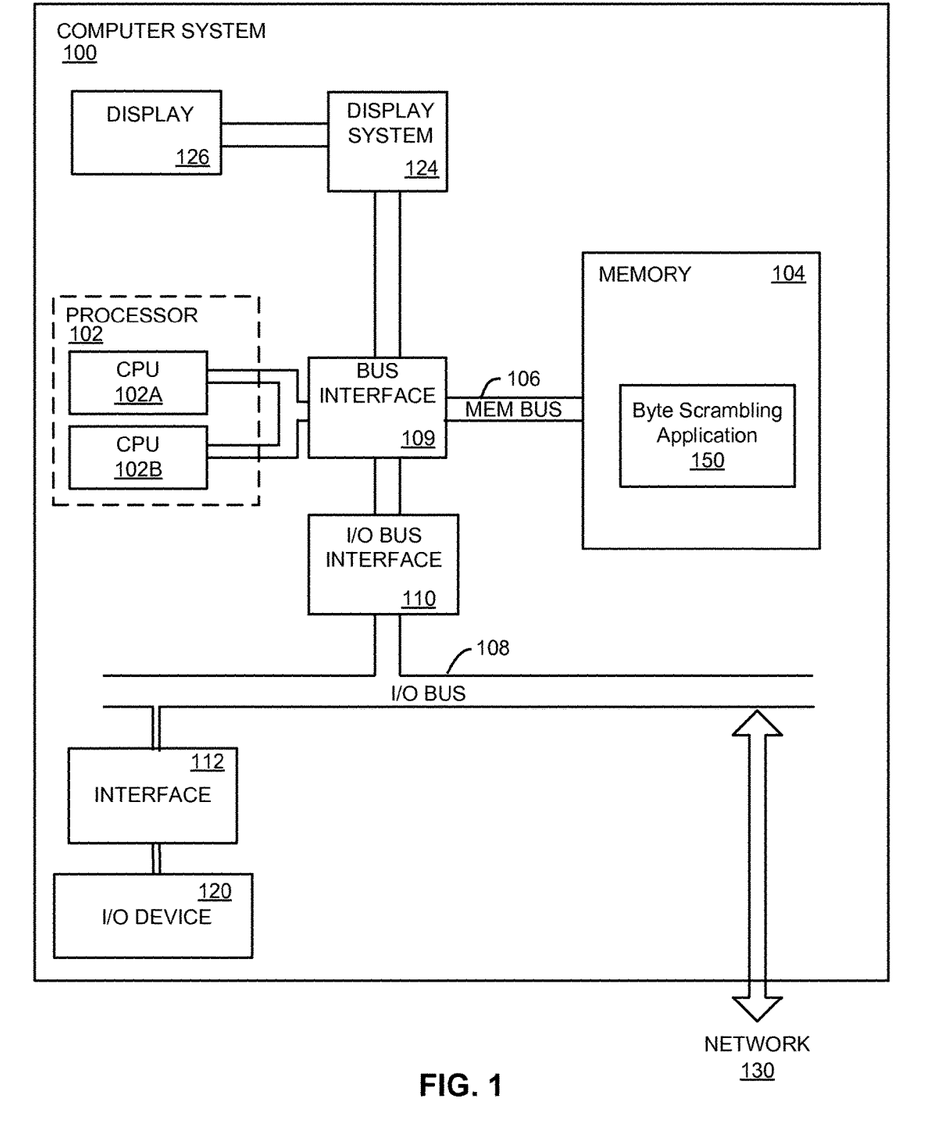
FIG. 1 is an apparatus for securing data transmissions, according to embodiments.

FIG. 1 depicts a high-level block diagram of a computer system 100 for securing data transmissions. The components of the various embodiments disclosed herein apply equally to any appropriate computing system. The components of the example computer system 100 shown in FIG. 1 include one or more processors 102, a memory 104, and interface 112, all of which are communicatively coupled, directly or indirectly, for inter-component communication via a memory bus 106, an I/O bus 108, bus interface unit 109, and an I/O bus interface unit 110. The computer system 100 may be within a secure physical facility which has a number of security measures for the integrity of data stored within the computer system 100.

The computer system 100 may contain one or more general-purpose programmable central processing units (CPUs) 102A and 102B, herein generically referred to as the processor 102. In some embodiments, the computer system 100 may contain multiple processors; however, in certain embodiments, the computer system 100 may alternatively be a single CPU system. Each processor 102 executes instructions—such as the instructions from the byte scrambling application 150 to perform the operations described with respect to method 200—stored in the memory 104.

In some embodiments, the memory 104 may include a random-access semiconductor memory, storage device, or storage medium (either volatile or non-volatile) for storing or encoding data and programs. The memory 104 can include stored data. In certain embodiments, the memory 104 represents the entire virtual memory of the computer system 100, and may also include the virtual memory of other computer systems coupled to the computer system 100 or connected via a network 130.

The memory 104 may store all or a portion of the various programs, modules and data structures for processing data transfers as discussed herein. For instance, the memory 104 can include the byte scrambling application 150. In this illustrative embodiment, the byte scrambling application 150 includes instructions or statements that execute on the processor 102 or instructions or statements that are interpreted by instructions or statements that execute on the processor 102 to carry out functions (e.g., the operations of method 200 from FIG. 2) as further described below. However, in other embodiments, the byte scrambling application 150 is implemented in hardware via semiconductor devices, chips, logical gates, circuits, circuit cards, and/or other physical hardware devices (e.g., ASIC or FPGA) in lieu of, or in addition to, a processor-based system.

In this example, the computer system 100 includes a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 may communicate with multiple I/O interface units, which are also known as I/O processors (IOPs) or I/O adapters (IOAs), through the I/O bus 108.

The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102. One or more buses of the computer system 100 may have a plurality of lanes which can transmit entire bytes at a time by sending a plurality of bits simultaneously in parallel.

The I/O interface units support communication with a variety of storage and I/O devices. For example, the interface 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using an input device in order to provide input data and commands to programs such as the byte scrambling application 150. The interface 112 may provide an interface to any of various other I/O devices or devices of other types, such as printers or fax machines.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While the I/O interface is shown separates the I/O bus 108 from various communications paths running to the various I/O devices, in other embodiments, some or all of the I/O devices are connected directly to one or more system I/O buses. A bus may send bytes from a transmitter to a receiver. The receiver may be a component of the computer system 100. For example, the receiver may be the processor 102, memory 104, an I/O device 120, or a display system 124. Alternatively, the receiver may be a part of another computer system on the network 130. The bus may send bits in parallel. The bus may scramble some bits and identify the desired order of bits according to the byte scrambling application 150.

FIG. 1 depicts several example components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
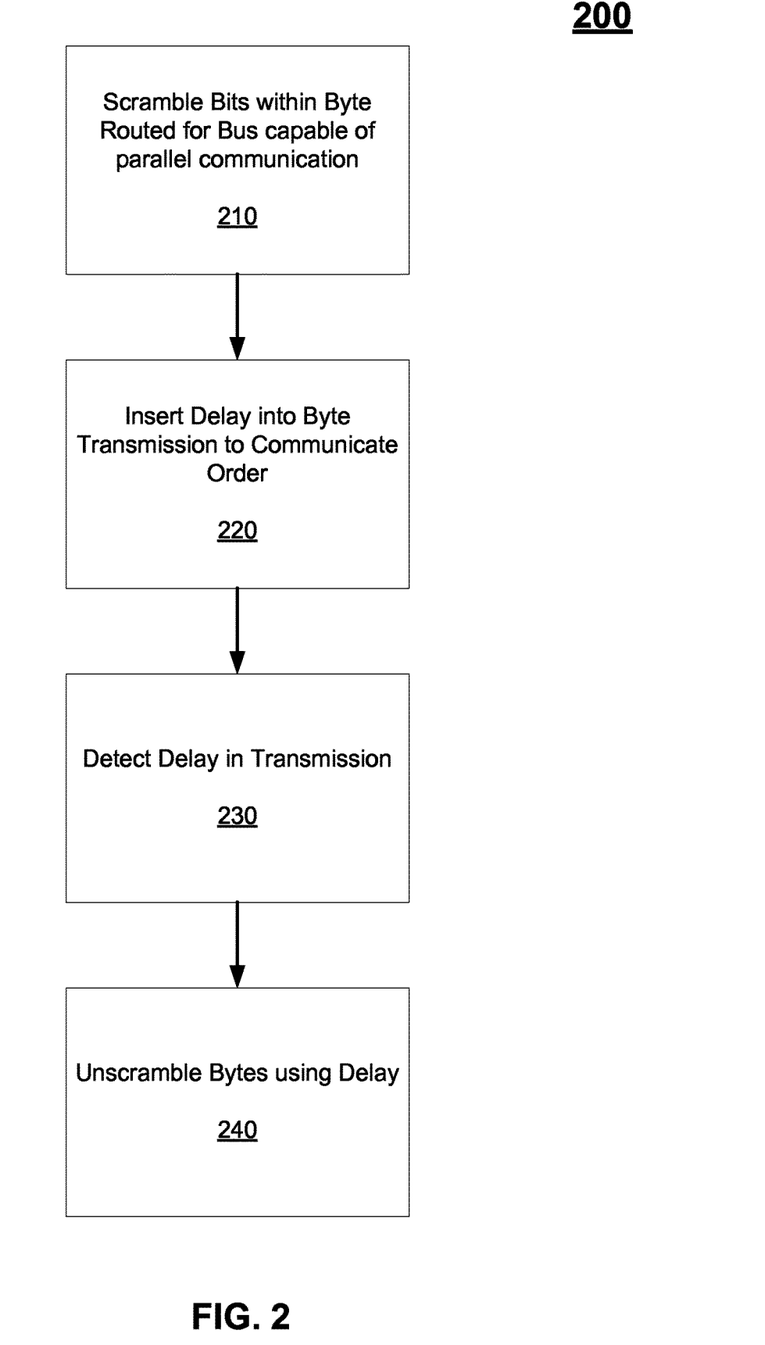
FIG. 2 is a method of securing data transmissions across a bus, according to embodiments.

FIG. 2 is a flowchart illustrating a method 200 for securing data transmission. The data transmission may be sent over a bus. The bus may have a plurality of lanes which are capable of sending bits in parallel. The bus may be between a transmitter and a receiver which use signal-matching techniques (e.g., delay lines, shift registers, phase-rotators) to align a clock of the transmitter and receiver. In some embodiments, the bus may be a component of a computing system which is maintained inside a physically secure facility. Some amount of the data within the computing system may be confidential. The visual arrangement of blocks in the flowchart of FIG. 2 is not to be construed as limiting the order in which the individual acts/operations may be performed, as certain embodiments may perform the operations of FIG. 2 in alternative orders.

At block 210 a set of bits is scrambled. The set of bits may be any number of bits, through for purposes of clarity the set of bits is discussed as a single byte (e.g., eight bits) herein; using a single byte as the selected set of bits is not to be limiting. The byte (e.g., selected byte) may be scrambled as part of a transmission. Scrambling the byte transmission may include changing the order of bits within the byte, such that the scrambled order of the bits during transmission over the bus is not the order in which the byte would be read by a processor. The order may be changed by arranging the bits of the byte in bus lanes which do not correspond with the order in which the bits would be read by a processor (e.g., the bit which would be read first is in a lane which usually corresponds with a bit which would be read second, while the bit which would be read second is in a lane which usually corresponds with a bit which would be read third, while the bit which would be read third is in a lane which usually corresponds with a bit which would be read first, etc.). By assigning bits to atypical lanes of the bus (that is, lanes which are not typically associated with the assigned order of the scrambled bits), the bit transmission may be made to appear as a garbled bit transmission to an unauthorized user who is, for example, physically probing the bus.

A byte may be scrambled by sequentially renumbering bits of the byte. For example, the byte may have a bit which is usually read first by the processor, which will be herein identified as bit zero. Bit zero may be followed by seven bits which themselves have a specific order in which said bits would be read by a processor, said bits being hereinafter referred to as bit one, two, three, four, five, six, and seven, respectively. While maintaining the values within the bits, bit zero may be renumbered, with each of the other seven bits sequentially renumbered thereafter. Sequentially renumbering may include "wrapping around" the end of the byte (e.g., the typical location of bit seven) and continuing renumbering at the beginning of the byte (e.g., the typical location of bit zero). For example, bit zero could be renumbered as bit two. Following sequentially, bit one could be renumbered as bit three and bit two could be renumbered as bit four, which could continue until bit seven would be renumbered as bit one.

A byte may also be scrambled by randomly renumbering bits of the byte. In some embodiments, the bits of the byte may be rearranged in a way such that the new order is not a simple sequentially renumbering of bits. For example, the bit zero could be renumbered to bit two, while bit one could be renumbered to bit seven, while bit two could be renumbered to bit four, etc. In certain embodiments, the bits of the byte may be rearranged in a predetermined way. In such embodiments, both the transmitter and receiver may be aware of the predetermined way of randomly rearranging the bits. Other ways of scrambling the bits of the byte are also possible.

In some embodiments, both a transmitter and receiver of a bus may be aware of the reordering nature of the byte. For example, a transmitter and receiver may both be configured to scramble and unscramble a sequentially renumbered byte, respectively. Alternatively, in other embodiments, a receiver may detect the reordering nature of the byte by the manner in which the transmitter transmits the byte. For example, a transmitter may randomly reorder bits, and may therein transmit the byte with eight positive delays of different durations/lengths corresponding to the new random order. The receiver may determine the reordering nature through the eight different positive delays.

A transmitter may similarly transmit a scrambled byte with negative delays to the same effect (e.g., wherein the negative delays communicate how to unscramble the byte), though for purposes of clarity positive delays are predominantly used herein. It is to be understood that this disclosure is not limited to using positive delays to communicate the nature of scrambled bytes, but to instead include using negative delays to the same end.

The byte may be one of a plurality of bytes transmitted by the bus from the transmitter. Other bytes of the plurality of bytes may remain in the order in which these bytes will be read by a processor. In some embodiments, bytes which are scrambled may include confidential data. In certain embodiments, only selected bytes which include confidential data may be scrambled. For example, in response to detecting 10,000 bytes of confidential data to be transmitted across a bus, a controller may identify 1,500 of the 10,000 bytes to scramble. Bytes which are scrambled may be selected by a controller to increase the disruption to unauthorized users reading the bits crossing the bus while also reducing the number of scrambled bytes, therein making it harder for unauthorized user to identify which bytes must be unscrambled to determine an accurate reading of confidential data. For example, where 1,500 of 10,000 bytes are selected, the 1,500 can be randomly distributed through the 10,000 bytes which increases the difficulty for an unauthorized user to identify which bytes are scrambled as compared to selecting the first 1,500 bytes. In addition, by using 1,500 randomly distributed bytes, the total number of bytes which are scrambled is reduced, as compared to scrambling all of the 10,000 bytes.

At block 220 the byte is transmitted across the bus using one or more positive or negative delays. The delays may communicate to the receiver the manner of scrambling the bit. The delays may be used in predetermined methods to communicate the manner of scrambling the byte, such that the receiver may identify how the byte was scrambled and therein unscramble the byte. The delays may be used on top of the signal-matching techniques used to align the clocks of the transmitter and receiver. The delays may be determined after initial delay calibration algorithm is executed. The delays may use the initial delay calibration algorithm as a baseline to generate an initial expected arrival time for transmissions.

Figure 3:
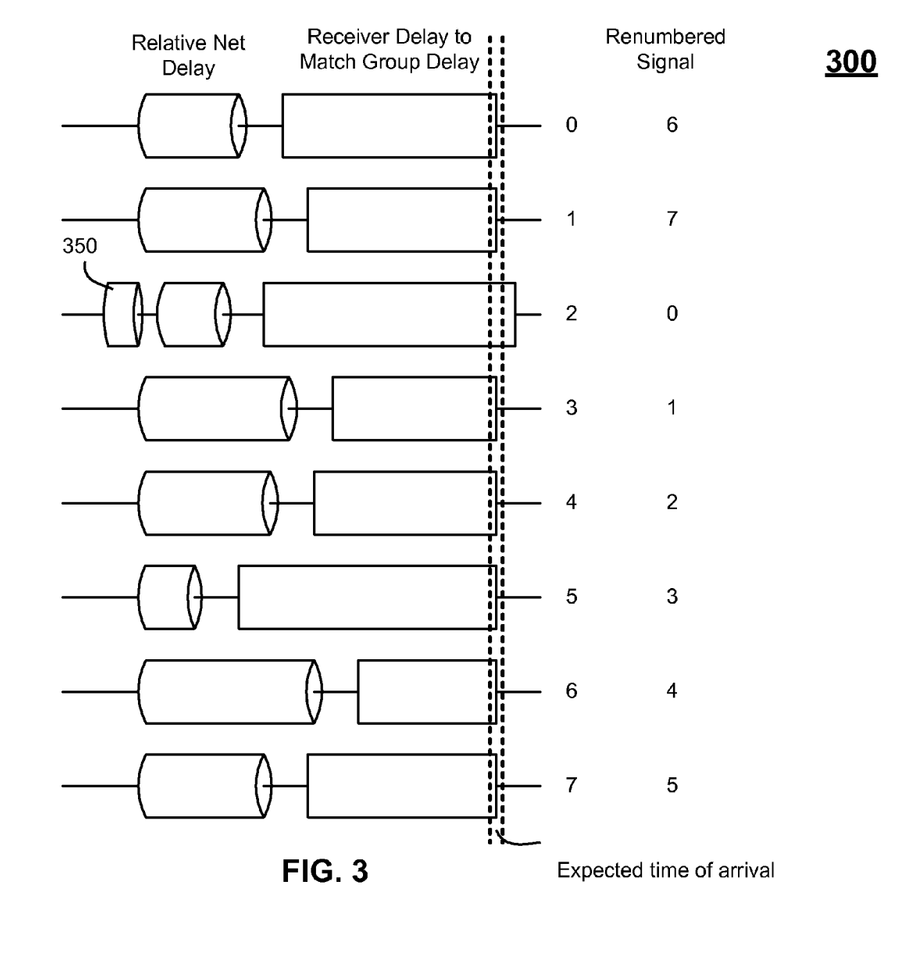
FIG. 3 is an illustration of using a delay to communicate a sequential renumbering of bits a selected byte, according to embodiments.

For an example of block 220, FIG. 3 shows a depiction of using a positive delay 350 to communicate a sequential renumbering of bits of the selected byte. In this embodiment the receiver and transmitter have already undergone signal-matching techniques, wherein the relative net delay between the clock of the transmitter and the clock of the receiver have been matched to allow signals to arrive at the receiver aligned. As depicted in FIG. 3, the top bit is in a lane typically assigned to bit zero, while the next bit is in a lane typically assigned to bit one, and so on. An unauthorized user probing a bus may read the bit according to this typical format. In this embodiment, however, the transmitter has sequentially renumbered the bits, identifying bit two as bit zero and renumbering from there. Accordingly, the transmitter has used a positive delay 350 to identify the selected new bit zero of the byte. In other embodiments, other bits may be given a positive delay to identify the order of bits (e.g., bit seven may be given a positive delay, with all other bits numbering down sequentially from there). As shown here, given that the signals have been matched, the selected bit may be identified.

Figure 4:
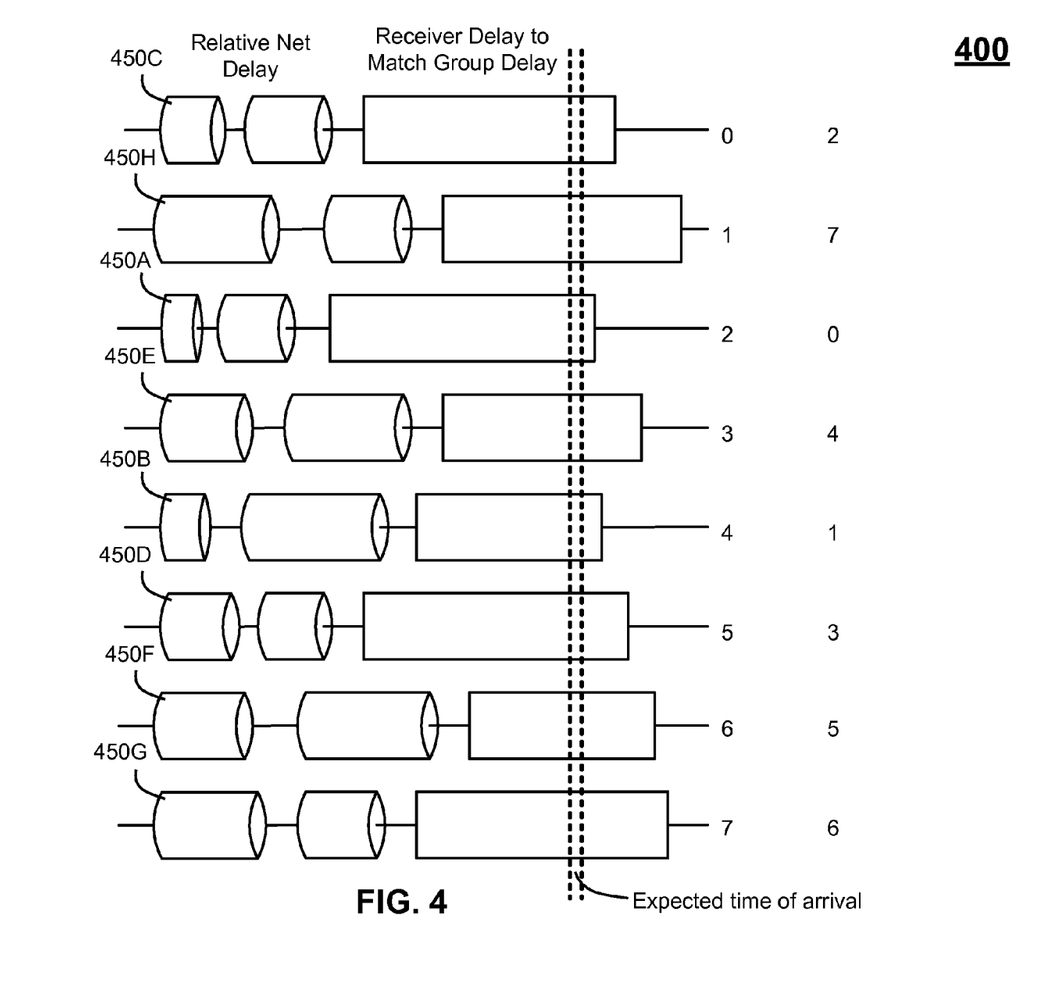
FIG. 4 is an illustration of using delays to communicate a random renumbering of bits a selected byte, according to embodiments.

For another example of block 220, FIG. 4 shows a depiction of using positive delays 450A-H to communicate a random renumbering of bits of the selected byte. As in FIG. 3, the receiver and transmitter are aligned with typical lanes. Lanes may be typically assigned to certain bits according to industry standards. In this embodiment, the transmitter has randomly renumbered the bits of the selected byte, putting bit zero at bit three, bit one at bit four, bit two at bit zero, bit three at bit five, bit four at bit three, bit five at bit six, bit six at bit seven, and bit seven at bit one. The transmitter has used a different positive delay for each bit, to communicate the new position of said bit. In this embodiment, bit zero has the shortest positive delay 450A, bit one has the next shortest positive delay 450B, and so on, continuing to bit seven with the longest delay 450H. Other embodiments of using different lengths/durations of positive delays to identify various bits of the byte are also possible (e.g., using the longest delay for bit zero, with each successive bit having a shorter delay).

At block 230, the receiver detects the positive or negative delay in the transmission of at least one bit of the selected byte. The receiver may detect the positive delay by comparing the expected timed arrival of bits of the selected byte (e.g., time zero) against the actual timed arrival of bits of the selected byte. If one or more bits of the selected byte arrives at a time which is outside the expected time of arrival, the bit(s) may satisfy a time criterion. In response to the satisfaction of the time criterion, the receiver may identify the byte transmission as having a positive delay, and therein may identify the byte as scrambled. A time criterion may be measured in many ways, such as in picoseconds or in fractions of the clock cycle or unit interval, to list a few examples. The time criterion may be measured by the internal clock of the receiver.

FIG. 3 and FIG. 4 may provide examples of block 230. In FIG. 3, the receiver may compare the received bits against the expected time of arrival. The receiver may detect that seven of the eight bits arrived within the expected time of arrival bandwidth, with the eighth bit arriving later than expected. The receiver may compare the lateness of the bit in lane two against the time criterion, determine that the lateness meets the time criterion, and identify the bit in lane two as having a positive delay 350. Accordingly, the receiver may identify the bit in lane two as being bit zero, in this embodiment.

In FIG. 4, the receiver may again compare the received bits against the expected time of arrival. The receiver may detect that all eight bits come in staggered and late, as compared to the expected time of arrival. In another embodiment, the receiver may detect that a single bit (e.g., bit zero) arrived within the expected time of arrival (e.g., bit zero did not have a positive delay), with the other seven bits being late. In detecting this lateness, the receiver may identify the bit transmission as using positive delays and the byte as being scrambled.

At block 240 of FIG. 2 the receiver unscrambles the byte using the positive delay. The receiver may unscramble the byte by identifying what the bit order is as communicated by the positive delay(s) and reordering the bits accordingly. For example, in FIG. 3, the receiver may identify that the positive delay in lane two is communicating that the bit within lane two is bit zero, with the other bits of the byte wrapping around the lanes sequentially. Accordingly, the receiver may order the byte with the bit in lane three as bit one, the bit in lane four as bit two, and so on, concluding the byte with the bit in lane one.

For another example, in FIG. 4, the receiver may identify that the length of each positive delay is communicating the intended order of the bit in the respective lane. For example, the shortest delay in lane two is communicating the presence of bit zero, while the longest delay in lane one is communicating the presence of bit seven. The receiver may then reorder the bits according to this communicated bit placement.

In certain embodiments, a controller may change the manner of scrambling a byte at intervals. For example, a transmitter and receiver may be configured to sequentially reorder bits with a positive delay on bit zero for a first hour of operation, then switch to sequentially reorder bits with a positive delay on bit one for the next hour of operation, and so on, continually changing at predetermined times which bit will receive the positive delay. Alternatively, a transmitter and receiver may be configured to sequentially reorder bits for a first 1,000 scrambled bytes, then switch to randomly reordering bits as described herein for the next 1,000 bytes, continually changing with each 1,000 scrambled bytes. Other embodiments of changing the manner of scrambling are also possible. By changing the manner of scrambling bytes at intervals, the scrambled order of the bytes may be more undetectable by an unauthorized user.

The functionality outlined in the discussions herein regarding FIG. 2, FIG. 3, and FIG. 4 above can be implemented using program instructions executed by a processing unit, as described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for securing data transmissions, the method comprising:
    scrambling a transmission of a selected set of bits over a bus between a transmitter and a receiver, wherein the bus communicates bits in parallel, wherein scrambling the selected set of bits includes assigning bits of the selected set of bits to an atypical set of lanes of the bus such that an order of the bits in which the selected set of bits is read by a processor is obscured; and
    transmitting the selected set of bits to the receiver with one or more delays on one or more lanes of the atypical set of lanes, wherein the one or more delays indicate the order of the bits, wherein the receiver is configured to use the one or more delays to identify the order of the bits.

2. The method of claim 1, further comprising using signal-matching techniques to align a clock of the transmitter and a clock of the receiver.

3. The method of claim 1, further comprising changing a manner of scrambling sets of bits at predetermined intervals.

4. The method of claim 1, further comprising:
    receiving the selected set of bits by the receiver;
    identifying the one or more delays;
    identifying the order of the bits using the one or more delays; and
    unscrambling the bits according to the identified order.

5. The method of claim 1, wherein scrambling the transmission of the selected set of bits comprises sequentially renumbering the bits of the selected set of bits beginning with a first bit not in a bit zero location.

6. The method of claim 5, wherein the one or more delays includes a single delay which indicates the first bit in the sequential renumbering, wherein the single delay is either a positive delay or a negative delay.

7. The method of claim 1, wherein scrambling the transmission of the selected set of bits comprises determining an alternative non-sequential order for the bits which is different than the order of the bits in which the selected set of bits is read by the processor.

8. The method of claim 7, wherein transmitting the selected set of bits to the receiver with the one or more delays further comprises:
    determining a set of delays which correspond with the alternative order; and
    inserting delays of the set of delays in lanes of bits which correspond with the alternative order.

9. A computer system comprising:
    a bus having a plurality of lanes for communicating bits in parallel;

a transmitter configured to transmit bits over the plurality of lanes of the bus to a receiver; and one or more processing circuits communicatively coupled to the bus and the receiver, wherein the one or more processing circuits are configured to:

scramble a transmission of a selected set of bits over the bus between the transmitter and the receiver by assigning bits of the selected set of bits to an atypical set of lanes of the bus such that an order of the bits in which the selected set of bits is read by a processor is obscured; and insert one or more delays on one or more lanes of the atypical set of lanes, wherein the one or more delays indicate the order of the bits.

10. The computer system of claim 9, wherein the transmitter is configured to use signal-matching techniques to align a clock of the transmitter and a clock of the receiver.

11. The computer system of claim 9, wherein the one or more processing circuits are further configured to change a manner of scrambling sets of bits at predetermined intervals.

12. The computer system of claim 9, wherein the one or more processing circuits are configured to assign bits of the selected set of bits to the atypical set of lanes of the bus by sequentially renumbering the bits of the selected set of bits beginning with a first bit not in bit zero location.

13. The computer system of claim 12, wherein the one or more delay includes a single delay which indicates the first bit in the sequential renumbering, wherein the single delay is either a positive delay or a negative delay.

14. The computer system of claim 9, wherein the one or more processing circuits are configured to assign bits of the selected set of bits to the atypical set of lanes of the bus by determining an alternative non-sequential order for the bits which is different than the order of the bits in which the selected set of bits is read by the processor.

15. The computer system of claim 14, wherein the one or more processing circuits are configured to transmit the selected set of bits via the transmitter to the receiver with the one or more delays by being further configured to:

determine a set of delays which correspond with the alternative order; and insert delays of the set of delays in lanes of bits which correspond with the alternative order.

16. A computer program product for securing data transmissions, the computer program product disposed upon a non-transitory computer readable storage medium, the computer program product comprising computer program instructions that, when executed by a computer processor of a computer, cause the computer to:

scramble a transmission of a selected set of bits over a bus between a transmitter and a receiver, wherein the bus communicates bits in parallel, wherein scrambling the selected set of bits includes assigning bits of the selected set of bits to an atypical set of lanes of the bus such that an order of the bits in which the selected set of bits is read by a processor is obscured; and transmit the selected set of bits to the receiver with one or more delays on one or more lanes of the atypical set of lanes, wherein the one or more delays indicate the order of the bits, wherein the receiver is configured to use the one or more delays to identify the order of the bits.

17. The computer program product of claim 16, wherein the computer program instructions are further configured to cause the computer processor to assign bits of the selected set of bits to the atypical set of lanes of the bus in an alternative non-sequential order for the bits which is different than the order of the bits in which the selected set of bits is read by the processor.

18. The computer program product of claim 16, the computer program product further comprising instructions which, when executed by the computer processor, cause the computer to change a manner of scrambling sets of bits at predetermined intervals.

19. The computer program product of claim 16, the computer program product further comprising instructions for scrambling the transmission of the selected set of bits which, when executed by the computer processor, cause the computer to:

sequentially renumber the bits of the selected set of bits beginning with a first bit not in bit zero location.

20. The computer program product of claim 19, wherein the one or more delay includes a single delay corresponding with the lane of the first bit which indicates the sequential renumbering, wherein the single delay is either a positive delay or a negative delay.

* * * * *